United States Patent
Hirai et al.

(10) Patent No.: US 11,171,715 B2
(45) Date of Patent: *Nov. 9, 2021

(54) CONTROL DEVICE, PROGRAM, CONTROL METHOD, AND FLIGHT VEHICLE

(71) Applicant: HAPSMobile Inc., Tokyo (JP)

(72) Inventors: Ryoji Hirai, Chiba (JP); Jutatsu Sai, Kanagawa (JP)

(73) Assignee: HAPSMobile Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/204,875

(22) Filed: Mar. 17, 2021

(65) Prior Publication Data
US 2021/0203408 A1 Jul. 1, 2021

Related U.S. Application Data

(63) Continuation of application No. PCT/JP2019/029020, filed on Jul. 24, 2019.

(30) Foreign Application Priority Data

Sep. 18, 2018 (JP) .............................. JP2018-174305

(51) Int. Cl.
*H04B 7/185* (2006.01)
*G08G 5/00* (2006.01)

(52) U.S. Cl.
CPC ....... *H04B 7/18506* (2013.01); *G08G 5/0008* (2013.01); *G08G 5/0013* (2013.01); *H04B 7/18534* (2013.01)

(58) Field of Classification Search
CPC ............ H04B 7/18506; H04B 7/18534; G08G 5/0008; G08G 5/0013
See application file for complete search history.

(56) References Cited

U.S. PATENT DOCUMENTS 4,385,381 A * 5/1983 Alexis ....................... H04L 5/02
370/210
5,448,623 A * 9/1995 Wiedeman ......... H04B 7/18556
455/12.1

(Continued)

FOREIGN PATENT DOCUMENTS

EP    2978258 A1    1/2016
GB    2354673 A     3/2001

(Continued)

OTHER PUBLICATIONS (ISA/237) Written Opinion of the International Search Authority for International Patent Application No. PCT/JP2019/029020, mailed by the Japan Patent Office dated Sep. 10, 2019.

(Continued)

*Primary Examiner* — Mussa A Shaawat

(57) ABSTRACT

Provided is a control device that controls flight vehicles having an antenna for forming a cell on the ground to provide a wireless communication service to a user terminal in the cell. The control device includes a replacement control unit that controls replacement of a first flight vehicle covering an object area on the ground by means of a cell with a second flight vehicle. The replacement control unit controls the first flight vehicle and the second flight vehicle such that the second flight vehicle moves to a location corresponding to the location of the first flight vehicle, the second flight vehicle and the first flight vehicle start providing a wireless communication service to a user terminal by Coordinated Multiple Point transmission/reception (CoMP), and then the first flight vehicle stops forming its cell.

11 Claims, 8 Drawing Sheets

(56) References Cited

U.S. PATENT DOCUMENTS

| | | | | |
|---|---|---|---|---|
| 5,450,448 | A | * | 9/1995 | Sheynblat ............ G01S 19/071 375/346 |
| 5,574,970 | A | * | 11/1996 | Linquist ............ H04B 7/18567 370/350 |
| 5,592,471 | A | * | 1/1997 | Briskman ................ H04B 7/06 370/320 |
| 5,835,487 | A | * | 11/1998 | Campanella ........... H04H 20/74 370/316 |
| 5,864,579 | A | * | 1/1999 | Briskman .............. H04B 7/216 375/130 |
| 5,867,109 | A | * | 2/1999 | Wiedeman ......... H04B 7/18534 455/13.1 |
| 5,867,490 | A | * | 2/1999 | Campanella ........... H04H 40/90 370/326 |
| 5,991,345 | A | * | 11/1999 | Ramasastry ....... H04B 7/18534 370/320 |
| 6,104,911 | A | * | 8/2000 | Diekelman ........ H04B 7/18534 342/352 |
| 6,128,276 | A | * | 10/2000 | Agee ...................... H04B 1/692 370/208 |
| 6,138,012 | A | | 10/2000 | Krutz |
| 6,208,858 | B1 | * | 3/2001 | Antonio ............. H04B 7/18541 455/429 |
| 6,301,313 | B1 | * | 10/2001 | Gevargiz ........... H04B 7/18534 370/321 |
| 6,510,317 | B1 | * | 1/2003 | Marko ................... H04B 1/005 455/277.1 |
| 6,724,827 | B1 | * | 4/2004 | Patsiokas ........... H04B 7/18523 342/42 |
| 6,920,323 | B1 | * | 7/2005 | Grayson ............ H04B 7/18534 370/324 |
| 6,956,814 | B1 | * | 10/2005 | Campanella ....... H04B 7/18534 370/210 |
| 6,968,187 | B1 | | 11/2005 | Irwin |
| 10,034,209 | B1 | | 7/2018 | Nandan |
| 2002/0049055 | A1 | | 4/2002 | Matthews |
| 2005/0164701 | A1 | | 7/2005 | Karabinis |
| 2005/0207375 | A1 | * | 9/2005 | Schiff ................ H04B 7/18513 370/331 |
| 2008/0160992 | A1 | * | 7/2008 | Jalali .................... H04B 7/0814 455/427 |
| 2009/0034448 | A1 | * | 2/2009 | Miller ................... H04B 7/1858 370/316 |
| 2009/0209277 | A1 | * | 8/2009 | Pinchas .............. H04B 7/18534 455/501 |
| 2010/0020743 | A1 | * | 1/2010 | Rigal ................. H04B 7/18534 370/319 |
| 2014/0373124 | A1 | | 12/2014 | Rubin |
| 2015/0236778 | A1 | | 8/2015 | Jalali |
| 2016/0156406 | A1 | | 6/2016 | Frolov |
| 2016/0205560 | A1 | | 7/2016 | Hyslop |
| 2016/0255580 | A1 | | 9/2016 | Onaka |
| 2017/0208512 | A1 | | 7/2017 | Aydin |
| 2018/0054251 | A1 | | 2/2018 | Alex |
| 2018/0083678 | A1 | | 3/2018 | Alexander |
| 2018/0102831 | A1 | * | 4/2018 | Murphy ................ H04W 64/00 |
| 2018/0166779 | A1 | | 6/2018 | Feria |
| 2018/0276993 | A1 | | 9/2018 | Chow |
| 2018/0279133 | A1 | | 9/2018 | Gayrard |
| 2018/0375568 | A1 | | 12/2018 | De Rosa |
| 2018/0376393 | A1 | | 12/2018 | Wu |
| 2019/0028197 | A1 | | 1/2019 | Turner |
| 2019/0028903 | A1 | * | 1/2019 | Carpenter ............. H04W 16/26 |
| 2019/0123811 | A1 | * | 4/2019 | Potter .................. H04B 7/0426 |
| 2019/0207676 | A1 | | 7/2019 | Noerpel |
| 2020/0221357 | A1 | | 7/2020 | Hong |
| 2020/0252941 | A1 | | 8/2020 | Schmidt |
| 2021/0058293 | A1 | * | 2/2021 | Whitefield ......... H04B 7/18539 |

FOREIGN PATENT DOCUMENTS

| | | |
|---|---|---|
| JP | 2002211496 A | 7/2002 |
| JP | 2003509951 A | 3/2003 |
| JP | 2017130983 A | 7/2017 |
| JP | 2017521962 A | 8/2017 |
| WO | 9907083 A1 | 2/1999 |

OTHER PUBLICATIONS

Office Action issued for counterpart Japanese Application No. 2018-174305, issued by the Japanese Patent Office dated Dec. 17, 2019 (drafted on Dec. 10, 2019).

Decision to Grant a Patent issued for counterpart Japanese Application No. 2018-174305, issued by the Japanese Patent Office dated Feb. 18, 2020 (drafted on Feb. 7, 2020).

(ISA/237) Written Opinion of the International Search Authority for International Patent Application No. PCT/JP2019/029963, mailed by the Japan Patent Office dated Oct. 21, 2019.

Decision to Grant a Patent issued for counterpart Japanese Application No. 2018-170064, issued by the Japanese Patent Office dated Apr. 7, 2020 (drafted on Apr. 2, 2020).

Extended European Search Report for European Patent Application No. 19860339.1, issued by the European Patent Office dated Jun. 21, 2021.

* cited by examiner

CONTROL DEVICE, PROGRAM, CONTROL METHOD, AND FLIGHT VEHICLE

The contents of the following Japanese and PCT applications are incorporated herein by reference:
NO. 2018-174305 filed in JP on Sep. 18, 2018 and
NO. PCT/JP2019/029020 filed in WO on Jul. 24, 2019.

BACKGROUND

1. Technical Field

The present invention relates to a control device, a program, a control method, and a flight vehicle.

2. Related Art

Flight vehicles that have an antenna and fly in the stratosphere in order to provide a stratospheric platform have been known (see PTL 1, for example).

CITATION LIST

Patent Literature

Patent Literature 1: Japanese Patent Application Publication No. 2002-211496

SUMMARY

It is desired to provide a technique capable of appropriately replacing a flight vehicle.

DESCRIPTION OF EXEMPLARY EMBODIMENTS

Hereinafter, the present invention will be described through an embodiment of the invention. However, the following embodiment does not limit the invention according to the scope of the claims. Also, not all the combinations of the features described in the embodiment are necessarily essential for the solving means of the invention.

Figure 1:
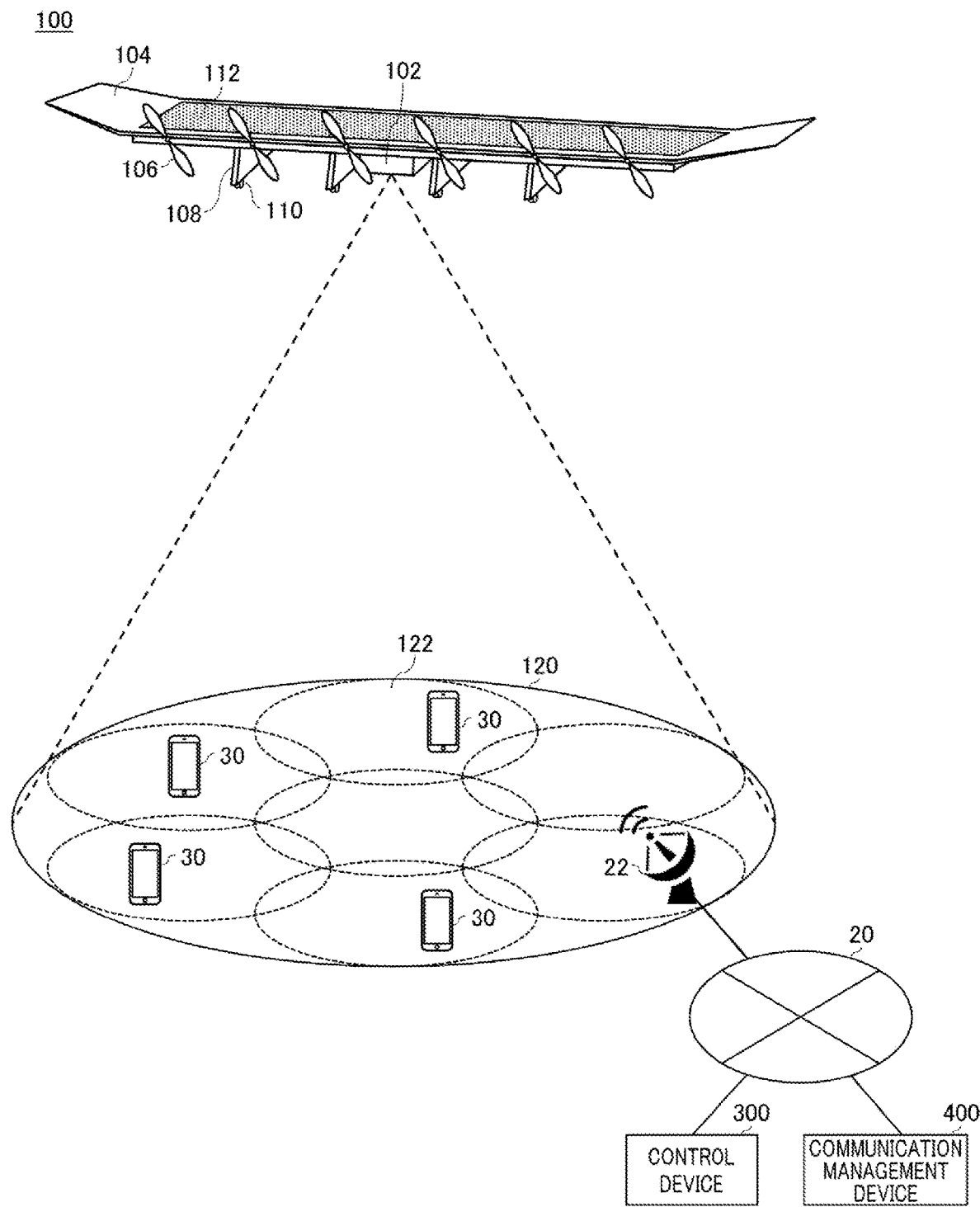
FIG. 1 schematically shows one example of a flight vehicle 100.

FIG. 1 schematically shows one example of a flight vehicle 100. The flight vehicle 100 includes a main body part 102 and a main wing part 104. The main body part 102 has propellers 106, skids 108, and wheels 110. The main wing part 104 has a solar panel 112.

The main body part 102 includes a battery and antenna not shown. Electrical power generated by the solar panel 112 is stored in the battery. The flight vehicle 100 is capable of flying by rotating the propellers 106 using the electrical power stored in the battery. Also, the flight vehicle 100 forms a communication area 120 on the ground with the antenna to provide a wireless communication service to user terminals 30 in the communication area 120. The antenna may be a multi-beam antenna, for example. The communication area 120 may be formed by a single cell. Alternatively, the communication area 120 may be formed by a plurality of sub-cells 122. That is, the communication area 120 may be formed by a multi-cell. The flight vehicle 100 provides the wireless communication service to the user terminals 30 on the ground while flying in the stratosphere for example. The flight vehicle 100 may serve as a stratospheric platform.

The user terminals 30 may be any terminals as long as they are communication terminals capable of communicating with the flight vehicle 100. For example, the user terminals 30 are mobile phones such as smartphones. The user terminals 30 may be tablet terminals, personal computers (PCs), or the like.

The flight vehicle 100 provides the wireless communication service to the user terminals 30 by, for example, relaying communication between the user terminals 30 and a network 20 on the ground. The network 20 may include a core network provided by a telecommunication carrier. Also, the network 20 may include the Internet.

The flight vehicle 100 may communicate with the network 20 via a gateway 22 in the communication area 120 among gateways 22 placed at locations on the ground. Alternatively, the flight vehicle 100 may communicate with the network 20 via, for example, a communication satellite not shown.

The flight vehicle 100, for example, transmits data received from the user terminals 30 in the communication area 120 to the network 20. Also, for example, upon receiving data addressed to the user terminals 30 in the communication area 120 via the network 20, the flight vehicle 100 transmits the data to the user terminals 30.

Communication performed by the user terminals 30 via the flight vehicle 100 may be managed by a communication management device 400. The communication management device 400 is placed in a core network of a telecommunication carrier, for example. The communication management device 400 may provide communication information on the communication performed by the user terminals 30 via the flight vehicle 100, to the outside. The communication information includes, for example, the communication traffic of the communication executed by the user terminals 30 via the flight vehicle 100. The communication management device 400 may transmit the communication information to the control device 300 via the network 20. Note that the control device 300 and the communication management device 400 may be integrated with each other. That is, the control device 300 may serve also as the communication management device 400.

The flight vehicle 100 may be controlled by the control device 300. The flight vehicle 100, for example, flies according to an instruction transmitted from the control device 300 via the network 20 and the gateway 22.

The control device 300 controls the flight vehicle 100 by transmitting the instruction. The control device 300 may cause the flight vehicle 100 to circle around above an object area on the ground in order to cover the object area by means of the communication area 120. Causing the flight vehicle 100 to circle around above an object area in order to cover the object area may also be referred to as a fixed-point flight. The control device 300 may cause the flight vehicle 100 to perform the fixed-point flight above each of a plurality of object areas to cause the flight vehicle 100 to cover each of the plurality of object areas.

The control device 300 executes replacement control processing of replacing the flight vehicle 100 covering an object area with another flight vehicle 100. For example, in a case of performing maintenance of the flight vehicle 100 covering the object area, the control device 300 replaces this flight vehicle 100 with another flight vehicle 100. Also, the control device 300 replaces the flight vehicle 100 covering the object area with another flight vehicle 100 at any timing according to an instruction from an operator.

In a case of replacing a first flight vehicle 100 covering an object area with a second flight vehicle 100, it is conceivable to, for example, cause the first flight vehicle 100 to stop providing a wireless communication service, send the second flight vehicle 100 to the flight area where the first flight vehicle 100 has been flying, and cause the second flight vehicle 100 to start providing a wireless communication service. In this case, however, a service interruption temporarily occurs or the quality of service temporarily degrades at the time of the replacement. In a case of a radio base station installed on the ground, the size of its cover area is limited and therefore the temporary degradation in quality of service is tolerable, whereas in a case of the flight vehicle 100, which serves as a stratospheric platform for example, its cover area is large and therefore the impact can be serious.

The control device 300 according to the present embodiment controls the first flight vehicle 100 and the second flight vehicle 100 such that the second flight vehicle 100 moves to a location corresponding to the location of the first flight vehicle 100, the second flight vehicle 100 and the first flight vehicle 100 start providing a wireless communication service to the user terminals 30 by Coordinated Multiple Point transmission/reception (CoMP), and then the first flight vehicle 100 stops forming its cell. The location corresponding to the location of the first flight vehicle 100 may be, for example, in the flight path of the first flight vehicle 100. For example, in a case where the first flight vehicle 100 is performing a fixed-point flight, the location corresponding to the location of the first flight vehicle 100 may be in the track of the fixed-point flight. Also, the location corresponding to the location of the flight vehicle 100 may be any location within a range of a predetermined distance from the flight vehicle 100.

In this way, the user terminals 30 camping on the cell of the first flight vehicle 100 can receive a service from the first flight vehicle 100 until the second flight vehicle 100 moves to the location corresponding to the location of the first flight vehicle 100, receive a service by CoMP after the second flight vehicle 100 has moved to the location corresponding to the location of the first flight vehicle 100, and receive a service from the second flight vehicle 100 after the first flight vehicle 100 stops forming its cell. That is, the control device 300 according to the present embodiment can suppress a temporary service interruption and a temporary degradation in quality of service, which the user terminals 30 would otherwise experience.

Figure 2:
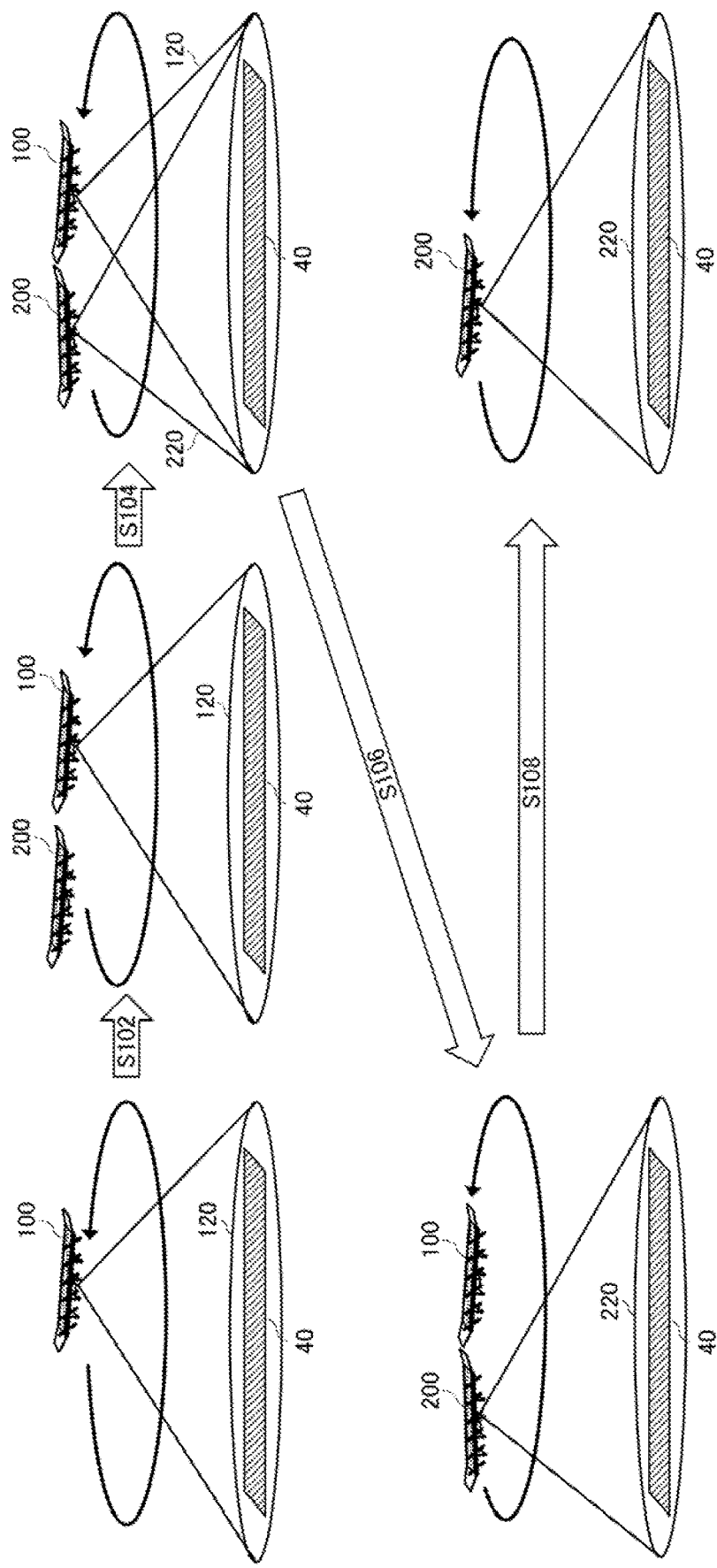
FIG. 2 schematically shows one example of the flow of replacement control processing by a control device 300.

FIG. 2 schematically shows one example of the flow of replacement control processing by the control device 300. A description will be given herein by taking, as an example, processing of replacing a flight vehicle 100 with a flight vehicle 200. The flight vehicle 200 has a configuration similar to that of the flight vehicle 100. The flight vehicle 100 and the flight vehicle 200 execute respective operations according to instructions from the control device 300. With FIG. 2, a description will be given while assuming a state where the flight vehicle 100 is performing a fixed-point flight above an object area 40 to cover the object area 40 by means of the communication area 120 as a starting state.

In S102, the flight vehicle 200 reaches a location corresponding to the location of the flight vehicle 100. In S104, the flight vehicle 200 forms a communication area 220. The flight vehicle 200 forms the communication area 220 with the same frequency as that of the communication area 120, and starts providing a wireless communication service to the user terminals 30 with the flight vehicle 100 by CoMP. Illustration of the user terminals 30 is omitted.

The flight vehicle 100 and the flight vehicle 200 may provide the wireless communication service to the user terminals 30 by CoMP Joint Transmission (JT). The user terminals 30 can receive data from the flight vehicle 100 and the flight vehicle 200 while the flight vehicle 100 and the flight vehicle 200 provide the wireless communication service to the user terminals 30 by CoMP. Also, the user terminals 30 can transmit data to any of the flight vehicle 100 and the flight vehicle 200. That is, UL reception from the user terminals 30 is switchable between the flight vehicle 100 and the flight vehicle 200.

In S106, the flight vehicle 100 stops forming the communication area 120. Then, the user terminals 30 can transmit and receive data to and from the flight vehicle 200. In S108, the flight vehicle 100 exits the track of the fixed-point flight and moves to a predetermined location or a designated location.

Figure 3:
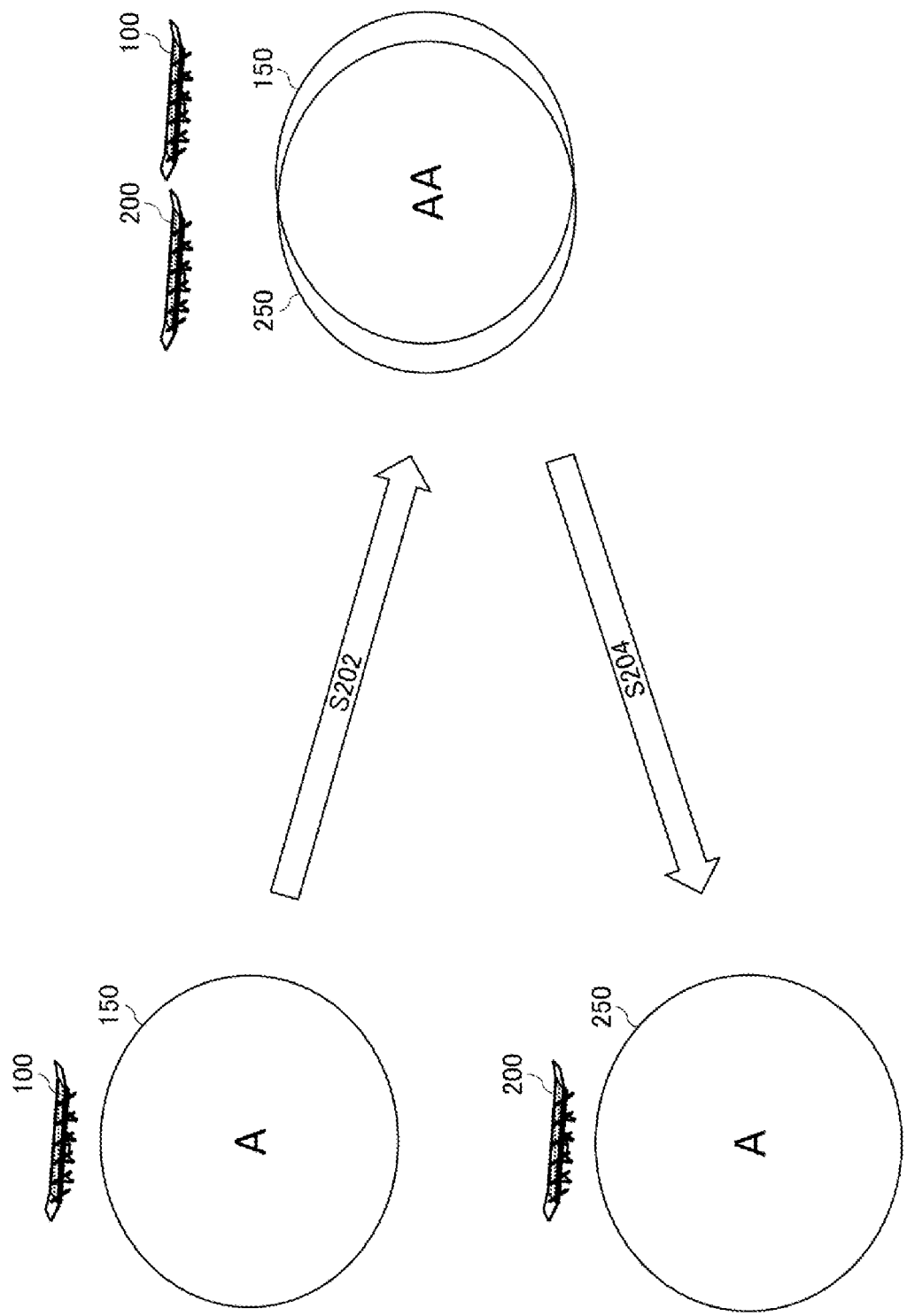
FIG. 3 schematically shows one example of the flow of replacement control processing by the control device 300.

FIG. 3 schematically shows one example of the flow of replacement control processing by the control device 300. A description will be given herein by taking, as an example, processing of replacing a flight vehicle 100 forming a cell 150 formed of a single cell with a flight vehicle 200. The flight vehicle 100 and the flight vehicle 200 execute respective operations according to instructions from the control device 300.

In S202, the flight vehicle 200 moves to a location corresponding to the location of the flight vehicle 100 and forms a cell 250 formed of a single cell with the same frequency as that of the cell 150. At this time, the control device 300 may cause the flight vehicle 200 and the flight vehicle 100 to perform footprint alignment for aligning the locations of the cell 250 and the cell 150 with each other. The control device 300 may inform the flight vehicle 200 of the location of the cell 150, inform the flight vehicle 100 of the location of the cell 250, or inform the flight vehicle 200 of the location of the cell 150 while informing the flight vehicle 100 of the location of the cell 250 to perform the footprint alignment. Alternatively, the control device 300 may designate the location of the cell 250 for the flight vehicle 200 and/or designate the location of the cell 150 for the flight vehicle 100 so as to align the locations of the cell 150 and the cell 250 with each other. Alternatively, the footprint alignment may be executed autonomously by the flight vehicle 100 and the flight vehicle 200. The control device 300 then causes the flight vehicle 200 and the flight vehicle 100 to start providing a wireless communication service to user terminals 30 by CoMP. Illustration of the user terminals 30 is omitted.

In S204, the flight vehicle 100 stops forming the cell 150, exits the track of the fixed-point flight, and moves to a predetermined location or a designated location. The cell 250 of the flight vehicle 200 covers the area that has been covered by the cell 150 of the flight vehicle 100.

As shown in FIG. 3, the flight vehicle 200 is caused to move to the location corresponding to the location of the flight vehicle 100 forming the cell 150 formed of a single cell, the flight vehicle 200 is caused to form the cell 250 formed of a single cell, the flight vehicle 100 and the flight vehicle 200 are caused to start providing a wireless communication service by CoMP, and then the formation of the cell 150 is stopped. In this way, a seamless switch between wireless communication services can be achieved and appropriate replacement of the flight vehicle 100 with the flight vehicle 200 can be achieved.

Figure 4:
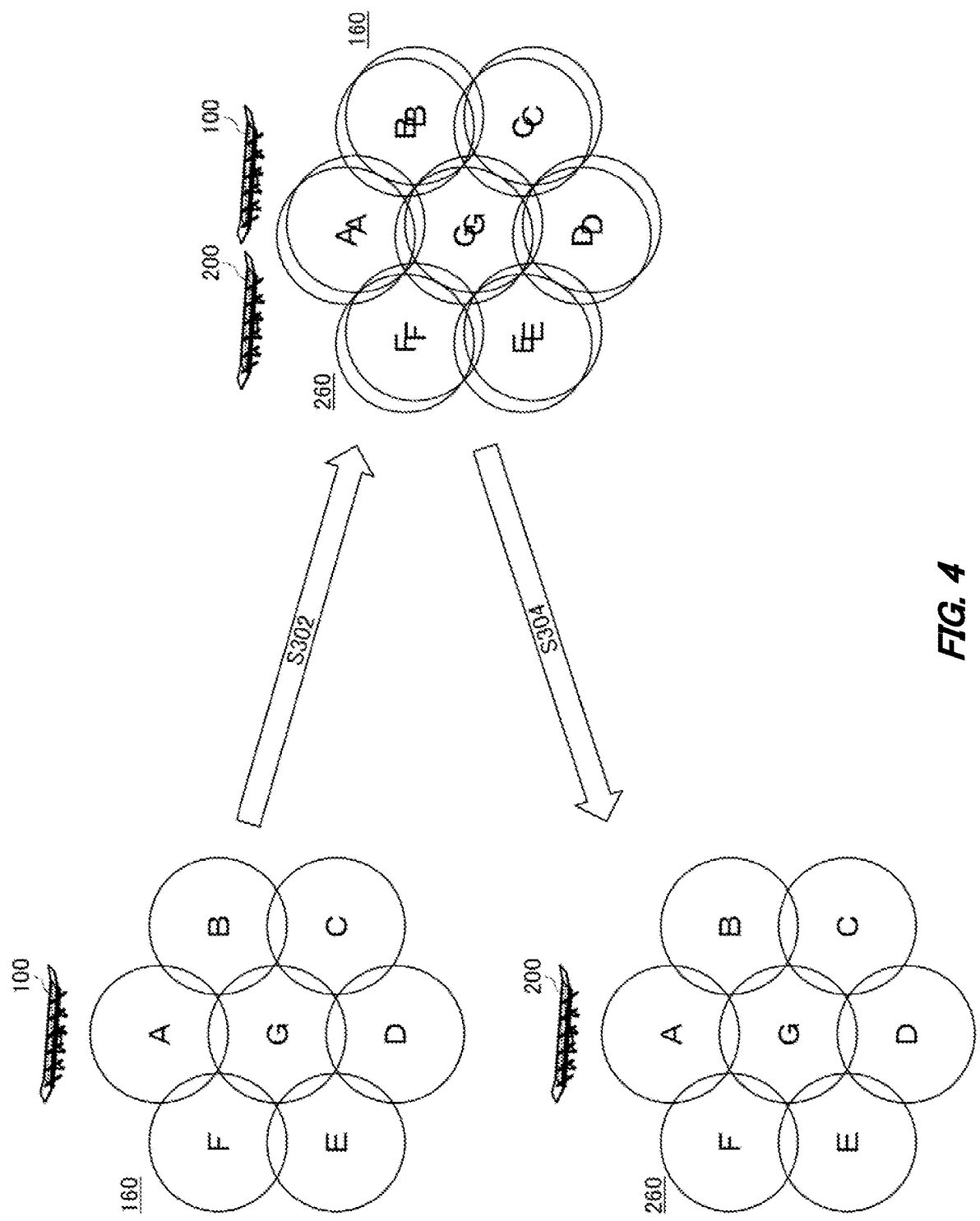
FIG. 4 schematically shows one example of the flow of replacement control processing by the control device 300.

FIG. 4 schematically shows one example of the flow of replacement control processing by the control device 300. A description will be given herein by taking, as an example, processing of replacing a flight vehicle 100 forming a multi-cell 160 with a flight vehicle 200. The flight vehicle 100 and the flight vehicle 200 execute respective operations according to instructions from the control device 300.

In S302, the flight vehicle 200 moves to a location corresponding to the location of the flight vehicle 100 and forms a multi-cell 260 having a configuration that is the same as that of the multi-cell 160. At this time, the control device 300 may cause the flight vehicle 200 and the flight vehicle 100 to perform footprint alignment for aligning the locations of the multi-cell 160 and the multi-cell 260 with each other. The control device 300 may inform the flight vehicle 200 of the location of the multi-cell 160, inform the flight vehicle 100 of the location of the multi-cell 260, or inform the flight vehicle 200 of the location of the multi-cell 160 while informing the flight vehicle 100 of the location of the multi-cell 260 to perform the footprint alignment. Alternatively, the control device 300 may designate the location of the multi-cell 260 for the flight vehicle 200 and/or designate the location of the multi-cell 160 for the flight vehicle 100 so as to align the locations of the multi-cell 160 and the multi-cell 260 with each other. Alternatively, the footprint alignment may be executed autonomously by the flight vehicle 100 and the flight vehicle 200. The control device 300 then causes the flight vehicle 100 and the flight vehicle 200 to start providing a wireless communication service to user terminals 30 by CoMP for each cell in the multi-cell 160 and the multi-cell 260. Illustration of the user terminals 30 is omitted.

In S304, the flight vehicle 100 stops forming the multi-cell 160, exits the track of the fixed-point flight, and moves to a predetermined location or a designated location. The multi-cell 260 of the flight vehicle 200 covers the area that has been covered by the multi-cell 160 of the flight vehicle 100.

As shown in FIG. 4, the flight vehicle 200 is caused to move to the location corresponding to the location of the flight vehicle 100 forming the multi-cell 160, the flight vehicle 200 is caused to form the multi-cell 260, the provision of the wireless communication service by CoMP is started, and then the formation of the multi-cell 160 is stopped. In this way, a seamless switch between wireless communication services can be achieved and appropriate replacement of the flight vehicle 100 with the flight vehicle 200 can be achieved.

Figure 5:
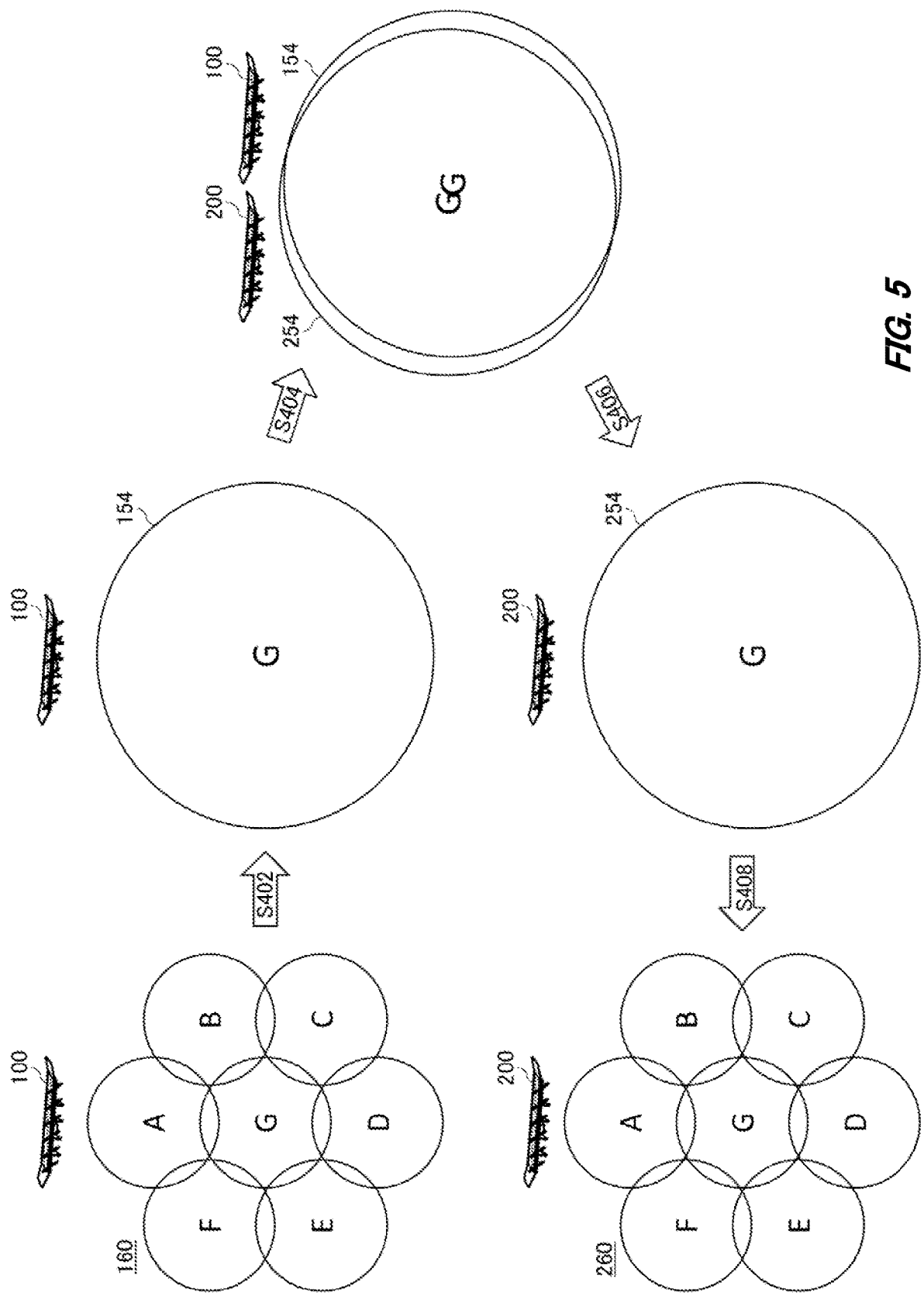
FIG. 5 schematically shows one example of the flow of replacement control processing by the control device 300.

FIG. 5 schematically shows one example of the flow of replacement control processing by the control device 300. Differences from FIG. 4 will be mainly described herein.

In S402, the flight vehicle 100 changes the multi-cell 160 into a virtual single cell 154 by CoMP. The flight vehicle 100 may change the multi-cell 160 into the virtual single cell 154 by, for example, determining one of the plurality of cells included in the multi-cell 160 to be a main cell, enlarging the main cell, and stopping the formation of the cells other than the main cell.

In S404, the flight vehicle 200 moves to a location corresponding to the location of the flight vehicle 100 and forms a cell 254 formed of a single cell with the same frequency as that of the virtual single cell 154. At this time, the control device 300 may cause the flight vehicle 200 and the flight vehicle 100 to perform footprint alignment for aligning the locations of the virtual single cell 154 and the cell 254 with each other. The control device 300 may inform the flight vehicle 200 of the location of the virtual single cell 154, inform the flight vehicle 100 of the location of the cell 254, or inform the flight vehicle 200 of the location of the virtual single cell 154 while informing the flight vehicle 100 of the location of the cell 254 to perform the footprint alignment. Alternatively, the control device 300 may designate the location of the cell 254 for the flight vehicle 200 and/or designate the location of the virtual single cell 154 for the flight vehicle 100 so as to align the locations of the virtual single cell 154 and the cell 254 with each other. Alternatively, the footprint alignment may be executed autonomously by the flight vehicle 100 and the flight vehicle 200. The control device 300 then causes the flight vehicle 100 and the flight vehicle 200 to start providing a wireless communication service to user terminals 30 by CoMP. Illustration of the user terminals 30 is omitted.

In S406, the flight vehicle 100 stops forming the virtual single cell 154, exits the track of the fixed-point flight, and moves to a predetermined location or a designated location.

In S408, the flight vehicle 200 forms the multi-cell 260. The flight vehicle 200 may form the multi-cell 260 by shrinking the cell 254 while forming a plurality of other cells. The multi-cell 260 of the flight vehicle 200 covers the area that has been covered by the multi-cell 160 of the flight vehicle 100.

As shown in FIG. 5, the flight vehicle 100 forming the multi-cell 160 is caused to change the multi-cell 160 into the virtual single cell 154. Then, the flight vehicle 200 is caused to move to the location corresponding to the location of the flight vehicle 100, the flight vehicle 200 is caused to form the cell 254, and the provision of the wireless communication service by CoMP is started. Then, the formation of the virtual single cell 154 is stopped, and the flight vehicle 200 is caused to change the cell 254 into the multi-cell 260. In this way, compared to the example shown in FIG. 4, the footprint alignment can be made unnecessary for each cell in the multi-cell 160 and the multi-cell 260. This can simplify the processing.

Note that in the case of the replacement control processing shown in FIG. 5, the user terminals 30 camping on a cell A, a cell B, a cell C, a cell D, a cell E, and a cell F may experience an instantaneous wireless interruption when the flight vehicle 100 changes the multi-cell 160 into the virtual single cell 154 in S402.

The control device 300 may, for example, determine the cell located at the center among the plurality of cells included in the multi-cell 160 to be the main cell. Alternatively, the control device 300 may determine the cell whose areas overlapping other cells have the largest total size among the plurality of cells included in the multi-cell 160 to be the main cell. In the example shown in FIG. 5, the cell G is determined to be the main cell. The control device 300 may then enlarge the main cell and stop the formation of the cells other than the main cell to change the multi-cell 160 into the virtual single cell 154. This can increase the number of user terminals 30, among the user terminals 30 camping on cells other than the main cell, capable of being free of an instantaneous wireless interruption through a handover to the main cell.

Alternatively, the control device 300 may determine the cell with the largest amount of communication traffic among the plurality of cells included in the multi-cell 160 to be the main cell. The control device 300 may then enlarge the main cell and stop the formation of the cells other than the main cell to change the multi-cell 160 into the virtual single cell 154. In this way, the number of user terminals 30 that experience an instantaneous wireless interruption can be smaller than in a case where another cell is determined to be the main cell.

Figure 6:
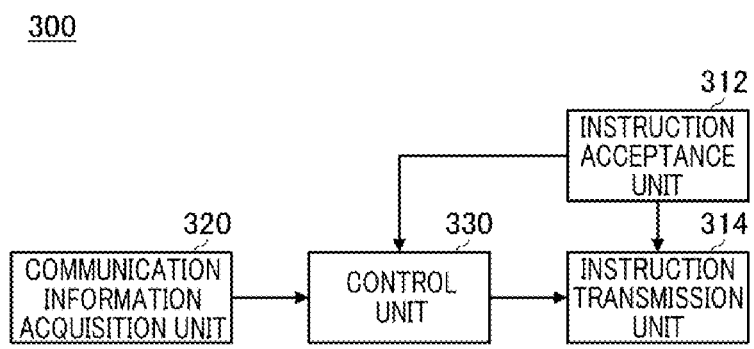
FIG. 6 schematically shows one example of the functional configuration of the control device 300.

FIG. 6 schematically shows one example of the functional configuration of the control device 300. The control device 300 includes an instruction acceptance unit 312, an instruction transmission unit 314, a communication information acquisition unit 320, and a control unit 330.

The instruction acceptance unit 312 accepts various instructions. The instruction acceptance unit 312 accepts, for example, an instruction that designates an object area 40. Also, the instruction acceptance unit 312 accepts, for example, an instruction that designates a track along which a flight vehicle 100 performs a fixed-point flight. Also, the instruction acceptance unit 312 accepts, for example, an instruction that designates a location at which to form a communication area. The instruction acceptance unit 312 may accept instructions inputted via an operation unit included in the control device 300. Also, the instruction acceptance unit 312 may accept instructions received via the network 20 via a communication unit included in the control device 300.

The instruction transmission unit 314 transmits instructions accepted by the instruction acceptance unit 312 to a flight vehicle 100. The instruction transmission unit 314 may transmit the instructions to a plurality of flight vehicles 100. The instruction transmission unit 314 may transmit the instructions to one flight vehicle 100 among the plurality of flight vehicles 100 and cause the one flight vehicle 100 to transmit the instructions to the other flight vehicles 100.

The communication information acquisition unit 320 acquires communication information on the communication in wireless communication services provided to user terminals 30 by a cell formed by the flight vehicle 100. For example, the communication information acquisition unit 320 acquires information on the communication traffic. The communication information acquisition unit 320 may receive the communication information from the communication management device 400.

The control unit 330 executes various kinds of control. The control unit 330 executes replacement control processing of flight vehicles 100. The control unit 330 may control the flight vehicles 100 by transmitting various instructions to the flight vehicles 100 via the instruction transmission unit 314. The control unit 330 may transmit a plurality of instructions to the flight vehicles 100 at individual timings or transmit the plurality of instructions to the flight vehicles 100 at once. The control unit 330 may be one example of a replacement control unit.

For example, the control unit 330 controls replacement of a first flight vehicle covering an object area on the ground by means of a cell with a second flight vehicle. The control unit 330 may control the first flight vehicle and the second flight vehicle such that the second flight vehicle moves to a location corresponding to the location of the first flight vehicle, the second flight vehicle and the first flight vehicle start providing a wireless communication service to user terminals by CoMP, and then the first flight vehicle stops forming its cell.

Alternatively, the control unit 330 may control the first flight vehicle and the second flight vehicle such that the second flight vehicle moves to a location corresponding to the location of the first flight vehicle covering an object area on the ground by means of a multi-cell, the second flight vehicle and the first flight vehicle start providing a wireless communication service using multi-cells to user terminals by CoMP, and then the first flight vehicle stops forming its multi-cell.

Alternatively, the control unit 330 may control the first flight vehicle and the second flight vehicle such that the first flight vehicle covering an object area on the ground by means of a multi-cell is caused to change the multi-cell into a virtual single cell, the second flight vehicle then moves to a location corresponding to the location of the first flight vehicle, the second flight vehicle and the first flight vehicle start providing a wireless communication service to user terminals by CoMP, and then the first flight vehicle stops forming its cell and the second flight vehicle forms a multi-cell. The control unit 330 may determine one cell in the multi-cell formed by the first flight vehicle to be a main cell and control the first flight vehicle so as to enlarge the main cell and stop the formation of the cells in the multi-cell other than the main cell to change the multi-cell into a virtual single cell.

The control unit 330 may determine the cell located at the center of the multi-cell formed by the first flight vehicle to be the main cell. Alternatively, the control unit 330 may determine the cell with the largest total size of areas overlapping other cells in the multi-cell formed by the first flight vehicle to be the main cell. Alternatively, the control unit 330 may determine the main cell based on the communication traffic in each cell of the multi-cell formed by the first flight vehicle. For example, the control unit 330 determines the cell with the largest amount of communication traffic in the multi-cell formed by the first flight vehicle to be the main cell.

Figure 7:
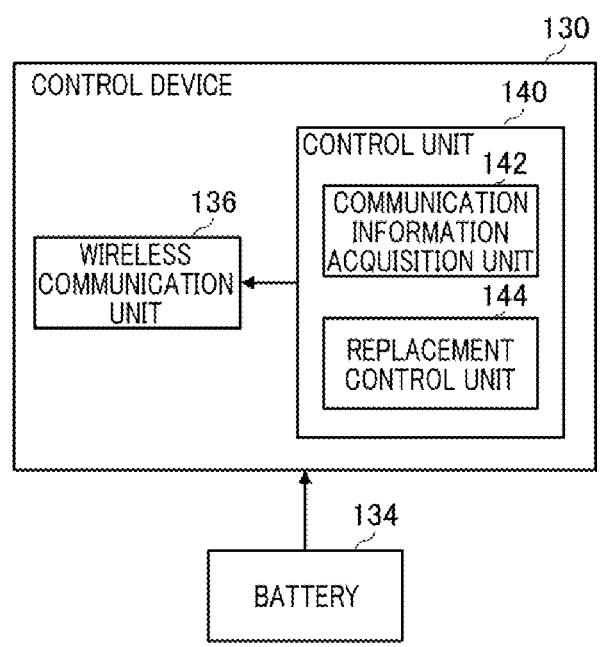
FIG. 7 schematically shows one example of the functional configuration of a control device 130 included in the flight vehicle 100.

FIG. 7 schematically shows one example of the functional configuration of a control device 130 included in a flight vehicle 100. The control device 130 includes a wireless communication unit 136 and a control unit 140.

The wireless communication unit 136 executes various kinds of communication by using electrical power stored in a battery 134. The wireless communication unit 136 forms the communication area 120, for example. The wireless communication unit 136 may execute communication with the network 20. The wireless communication unit 136 may execute communication with the control device 300. The wireless communication unit 136 may execute communication with the communication management device 400. The wireless communication unit 136 may execute communication with other flight vehicles 100. The wireless communication unit 136 may execute communication with a communication satellite.

The control unit 140 controls the flight of the flight vehicle 100. Also, the control unit 140 controls the formation of the communication area by the wireless communication unit 136. The control unit 140 may control the flight of the flight vehicle 100, the formation of the communication area, and the like according to instructions from the control device 300.

The control unit 140 has a communication information acquisition unit 142 and a replacement control unit 144. The communication information acquisition unit 142 acquires communication information on the communication in the wireless communication service provided to user terminals 30 by the cell formed by the flight vehicle 100. For example, the communication information acquisition unit 142 acquires information on the communication traffic. The communication information acquisition unit 142 may receive the communication information from the communication management device 400.

The replacement control unit 144 controls replacement with another flight vehicle 100. For example, the replacement control unit 144 executes replacement control processing in which when the associated flight vehicle (the flight vehicle 100 equipped with the replacement control unit 144 may be referred to as the associated flight vehicle) is covering an object area on the ground by means of a cell formed by the wireless communication unit 136 while performing a fixed-point flight above the object area, the coverage of the object area is handed over to another flight vehicle 100.

When the other flight vehicle 100 has moved to a location corresponding to the location of the associated flight vehicle, the replacement control unit 144 starts providing a wireless communication service to the user terminals 30 with this other flight vehicle 100 by CoMP. Then, after starting the wireless communication service by CoMP, the replacement control unit 144 causes the wireless communication unit 136 to stop forming its cell. The replacement control unit 144 then causes the associated flight vehicle to move to a predetermined location or a designated location.

In a case where the associated flight vehicle is covering the object area on the ground by means of a multi-cell, then, when the other flight vehicle 100 has moved to the location corresponding to the location of the associated flight vehicle, the replacement control unit 144 may start providing a wireless communication service using multi-cells to the user terminals 30 with this other flight vehicle 100 by CoMP. Then, after starting the wireless communication service by CoMP, the replacement control unit 144 causes the wireless communication unit 136 to stop forming its multi-cell. The replacement control unit 144 then causes the associated flight vehicle to move to a predetermined location or a designated location.

Also, in the case where the associated flight vehicle is covering the object area on the ground by means of a multi-cell, the replacement control unit 144 may firstly cause the wireless communication unit 136 to change the multi-cell into a virtual single cell. Then, when the other flight vehicle 100 has moved to the location corresponding to the location of the associated flight vehicle, the replacement control unit 144 may start providing a wireless communication service to the user terminals 30 with this other flight vehicle 100 by CoMP. Then, after starting the wireless communication service by CoMP, the replacement control unit 144 causes the wireless communication unit 136 to stop forming its cell. The replacement control unit 144 then causes the associated flight vehicle to move to a predetermined location or a designated location.

In the case of causing the wireless communication unit 136 to change the multi-cell into a virtual single cell, the replacement control unit 144 may determine one cell in the multi-cell to be a main cell, enlarge the main cell, and stop the formation of the cells in the multi-cell other than the main cell to change the multi-cell into the virtual single cell. The replacement control unit 144 may determine the cell located at the center of the multi-cell to be the main cell. Alternatively, the replacement control unit 144 may determine the cell whose areas overlapping other cells have the largest total size in the multi-cell to be the main cell. Alternatively, the replacement control unit 144 may determine the main cell based on the communication traffic in each cell of the multi-cell. For example, the replacement control unit 144 determines the cell with the largest amount of communication traffic in the multi-cell to be the main cell.

The replacement control unit 144 may execute replacement control processing of replacing another flight vehicle 100 covering an object area on the ground by forming a cell on the ground with the associated flight vehicle.

The replacement control unit 144 may cause the associated flight vehicle to move to a location corresponding to the location of the other flight vehicle 100, then cause the wireless communication unit 136 to form a cell with the same frequency as that of the cell formed by the other flight vehicle 100, and start a wireless communication service for the user terminals 30 with the other flight vehicle 100 by CoMP.

In a case where the other flight vehicle 100 is covering the object area on the ground by means of a multi-cell, the replacement control unit 144 may cause the associated flight vehicle to move to the location corresponding to the location of the other flight vehicle 100, then cause the wireless communication unit 136 to form a multi-cell with the same configuration as that of the multi-cell formed by the other flight vehicle 100, and start a wireless communication service for the user terminals 30 using the multi-cells with the other flight vehicle 100 by CoMP.

The replacement control unit 144 may, for example, start a wireless communication service for the user terminals 30 by means of single cells with the other flight vehicle 100 by CoMP and, after the other flight vehicle 100 stops forming its cell, cause the wireless communication unit 136 to change its single cell into a multi-cell. In the case of causing the wireless communication unit 136 to change its single cell into a multi-cell, the replacement control unit 144 may cause the wireless communication unit 136 to shrink the single cell while forming a plurality of other cells to form the multi-cell.

Figure 8:
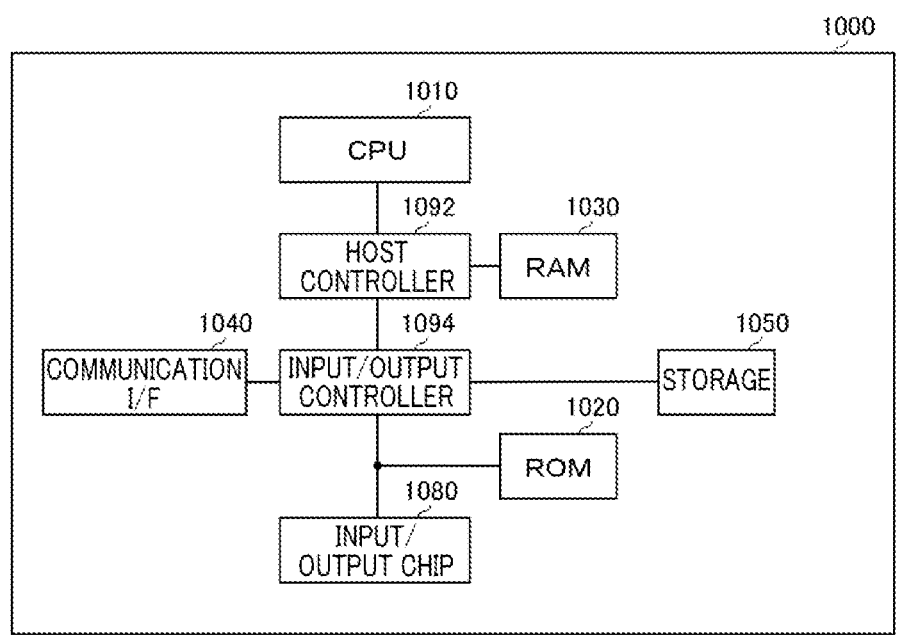
FIG. 8 schematically shows one example of the hardware configuration of a computer 1000 serving as the control device 130 or the control device 300.

FIG. 8 schematically shows one example of a computer 1000 that serves as the control device 130 or the control device 300. The computer 1000 according to the present embodiment includes a central processing unit (CPU) peripheral unit having a CPU 1010 and a random access memory (RAM) 1030 connected to each other by a host controller 1092, and an input/output unit having a read-only memory (ROM) 1020, a communication interface (I/F) 1040, a storage 1050, and an input/output chip 1080 connected to the host controller 1092 by an input/output controller 1094.

The CPU 1010 operates based on programs stored in the ROM 1020 and the RAM 1030 and controls each component. The communication I/F 1040 communicates with other devices via a network. Also, the communication I/F 1040 serves as hardware that performs communication. The storage 1050 may be a hard disk drive, a solid-state disk, a solid-state drive, or the like and stores programs and data to be used by the CPU 1010.

The ROM 1020 stores a boot program that is executed by the computer 1000 at start-up, programs that are dependent on the hardware of the computer 1000, and the like. The input/output chip 1080 connects various input/output devices to the input/output controller 1094 via, for example, a Universal Serial Bus (USB) port, a parallel port, a serial port, a keyboard port, a mouse port, and the like.

Programs to be provided to the storage 1050 via the RAM 1030 are stored in a recording medium such as an integrated-circuit (IC) card and provided by a user. The programs are read out of the recording medium, installed into the storage 1050 via the RAM 1030, and executed by the CPU 1010.

The programs that are installed in the computer 1000 and cause the computer 1000 to serve as the control device 130 or the control device 300 may work on the CPU 1010 and the like to cause the computer 1000 to serve as each component in the control device 130 or the control device 300. By being read into the computer 1000, the information processing described in these programs serves as the wireless communication unit 136 and the control unit 140, which are specific means representing cooperation of software and the various hardware resources described above. Also, by being read into the computer 1000, the information processing described in these programs serves as the instruction acceptance unit 312, the instruction transmission unit 314, the communication information acquisition unit 320, and the control unit 330, which are specific means representing cooperation of software and the various hardware resources described above. Moreover, by implementing information computation or processing suitable for the intended use of the computer 1000 in the present embodiment with these specific means, the unique control device 130 or control device 300 suitable for the intended use is configured.

While an embodiment of the present invention has been described above, the technical scope of the present invention is not limited to the scope of the above-described embodiment. It is apparent to persons skilled in the art that various alterations or improvements can be added to the above-described embodiment. It is apparent from the scope of the claims that the embodiments added with such alterations or improvements can also be included in the technical scope of the present invention.

It is to be noted that the processes such as the operations, procedures, steps, stages, and the like performed by the device, system, program, and method shown in the scope of the claims, description, and diagrams can be executed in any order as long as the order is not particularly and clearly indicated by "before," "prior to," or the like and as long as the output from a previous process is not used in a later process. Even if the operation flow is described using phrases such as "first" or "next" in the scope of the claims, description, or diagrams, it does not necessarily mean that the process must be performed in this order.

REFERENCE SIGNS LIST

20 network
22 gateway
30 user terminal
40 object area
100 flight vehicle
102 main body part
104 main wing part
106 propeller
108 skid
110 wheel
112 solar panel
120 communication area
122 sub-cell
130 control device
134 battery
136 wireless communication unit
140 control unit
142 communication information acquisition unit
144 replacement control unit
150 cell
154 virtual single cell
160 multi-cell
200 flight vehicle
220 communication area
250 cell
254 cell
260 multi-cell
300 control device
312 instruction acceptance unit
314 instruction transmission unit
320 communication information acquisition unit
330 control unit
1000 computer
1010 CPU
1020 ROM
1030 RAM
1040 communication I/F
1050 storage
1080 input/output chip
1092 host controller
1094 input/output controller

What is claimed is:

1. A control device that controls flight vehicles having an antenna for forming a cell on ground to provide a wireless communication service to a user terminal in the cell, the control device comprising
a replacement control unit that controls replacement of a first flight vehicle covering an object area on the ground by means of the cell with a second flight vehicle, wherein
the replacement control unit controls the first flight vehicle and the second flight vehicle such that the first flight vehicle covering the object area on the ground by means of a multi-cell is caused to change the multi-cell into a virtual single cell, the second flight vehicle then moves to a location corresponding to a location of the first flight vehicle, the second flight vehicle and the first flight vehicle start providing a wireless communication service to the user terminal by Coordinated Multiple Point transmission/reception (CoMP), and then the first flight vehicle stops forming the cell and the second flight vehicle forms a multi-cell.

2. The control device according to claim 1, wherein the replacement control unit controls the first flight vehicle and the second flight vehicle such that the second flight vehicle moves into a track of the first flight vehicle performing a fixed-point flight above the object area, the second flight vehicle and the first flight vehicle start providing a wireless communication service to the user terminal by CoMP, and then the first flight vehicle stops forming the cell.

3. The control device according to claim 1, wherein the replacement control unit determines one cell in the multi-cell formed by the first flight vehicle to be a main cell and controls the first flight vehicle so as to enlarge the main cell and stop formation of cells in the multi-cell other than the main cell to change the multi-cell into the virtual single cell.

4. The control device according to claim 3, wherein the replacement control unit determines a cell located at a center of the multi-cell formed by the first flight vehicle to be the main cell.

5. The control device according to claim 3, wherein the replacement control unit determines a cell whose area overlapping another cell has a largest total size in the multi-cell formed by the first flight vehicle to be the main cell.

6. The control device according to claim 3, wherein the replacement control unit determines the main cell based on communication traffic in each cell in the multi-cell formed by the first flight vehicle.

7. The control device according to claim 6, wherein the replacement control unit determines a cell with a largest amount of communication traffic in the multi-cell formed by the first flight vehicle to be the main cell.

8. A non-transitory computer readable medium having stored thereon a program, that when executed, causes a computer to serve as a control device that controls flight vehicles having an antenna for forming a cell on ground to provide a wireless communication service to a user terminal in the cell, the control device comprising a replacement control unit that controls replacement of a first flight vehicle covering an object area on the ground by means of the cell with a second flight vehicle, wherein the replacement control unit controls the first flight vehicle and the second flight vehicle such that the first flight vehicle covering the object area on the ground by means of a multi-cell is caused to change the multi-cell into a virtual single cell, the second flight vehicle then moves to a location corresponding to a location of the first flight vehicle, the second flight vehicle and the first flight vehicle start providing a wireless communication service to the user terminal by Coordinated Multiple Point transmission/reception (CoMP), and then the first flight vehicle stops forming the cell and the second flight vehicle forms a multi-cell.

9. A control method to be executed by a control device that controls flight vehicles having an antenna for forming a cell on ground to provide a wireless communication service to a user terminal in the cell, the control method comprising a replacement control step of controlling replacement of a first flight vehicle covering an object area on the ground by means of the cell with a second flight vehicle, wherein the replacement control step includes controlling the first flight vehicle and the second flight vehicle such that the first flight vehicle covering the object area on the ground by means of a multi-cell is caused to change the multi-cell into a virtual single cell, the second flight vehicle then moves to a location corresponding to a location of the first flight vehicle, the second flight vehicle and the first flight vehicle start providing a wireless communication service to the user terminal by Coordinated Multiple Point transmission/reception (CoMP), and then the first flight vehicle stops forming the cell and the second flight vehicle forms a multi-cell.

10. A flight vehicle having an antenna for forming a cell on ground to provide a wireless communication service to a user terminal in the cell, the flight vehicle comprising:

a wireless communication unit that forms the cell; and a replacement control unit that, while an object area on the ground is covered by means of the cell, executes replacement processing of handing over coverage of the object area to another flight vehicle, wherein in a case where the flight vehicle is covering the object area by means of a multi-cell, the replacement control unit controls the wireless communication unit so as to change the multi-cell into a virtual single cell and, when the other flight vehicle has moved to a location corresponding to a location of the flight vehicle, controls the wireless communication unit so as to stop forming the cell after start of provision of a wireless communication service to the user terminal together with the other flight vehicle by Coordinated Multiple Point transmission/reception (CoMP).

11. A flight vehicle having an antenna for forming a cell on ground to provide a wireless communication service to a user terminal in the cell, the flight vehicle comprising:

a wireless communication unit that forms the cell; and a replacement control unit that controls replacement with another flight vehicle covering an object area on the ground by means of the cell, wherein the replacement control unit controls the flight vehicle such that, after the other flight vehicle covering the object area by means of a multi-cell changes the multi-cell into a virtual single cell, the flight vehicle is caused to move to a location corresponding to a location of the other flight vehicle, causes the wireless communication unit to form a cell formed of a single cell with a same frequency as that of the virtual single cell, starts providing a wireless communication service to the user terminal together with the other flight vehicle by Coordinated Multiple Point transmission/reception (CoMP), and causes the wireless communication unit to change the single cell into a multi-cell after the other flight vehicle stops forming the cell.

* * * * *